United States Patent
Cao et al.

(10) Patent No.: US 12,145,573 B2
(45) Date of Patent: Nov. 19, 2024

(54) SYSTEM AND METHOD FOR VEHICLE TURNING RADIUS REDUCTION

(71) Applicant: Ford Global Technologies, LLC, Dearborn, MI (US)

(72) Inventors: Bang Cao, Northville, MI (US); Zubair Feroz, Dearborn, MI (US); Shubham Dixit, Dearborn, MI (US); Jose Velazquez Alcantar, Canton, MI (US); Kevin Sallee, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 487 days.

(21) Appl. No.: 17/145,737

(22) Filed: Jan. 11, 2021

(65) Prior Publication Data
US 2022/0219676 A1    Jul. 14, 2022

(51) Int. Cl.
*B60W 30/045*    (2012.01)
*B60K 1/02*    (2006.01)
(Continued)

(52) U.S. Cl.
CPC ............ *B60W 30/045* (2013.01); *B60K 1/02* (2013.01); *B60L 7/10* (2013.01); *B60W 10/08* (2013.01); *B60W 10/18* (2013.01); *B62D 6/00* (2013.01); *B62D 7/1509* (2013.01); *B60W 2510/20* (2013.01); *B60W 2520/10* (2013.01);
(Continued)

(58) Field of Classification Search
CPC ............ B60K 1/02; B60L 7/10; B60W 10/08; B60W 10/18; B60W 2552/40; B60W 2510/20; B60W 2520/10; B60W 2520/12; B60W 2520/26; B60W 2520/28; B60W 2540/10; B60W 2540/12; B60W 2710/083; B60W 2710/18; B60W 2720/40; B62D 6/00; B62D 7/1509
See application file for complete search history.

(56) References Cited

U.S. PATENT DOCUMENTS

| 7,979,189 B2 | 7/2011 | Nihei |
| 2006/0076828 A1 | 4/2006 | Lu et al. |

(Continued)

FOREIGN PATENT DOCUMENTS

| JP | 2009166514 A | 7/2009 |
| JP | 4967862 B2 | 4/2012 |
| JP | 5040508 B2 | 7/2012 |

*Primary Examiner* — Mahmoud S Ismail
*Assistant Examiner* — Gabriel Anfinrud
(74) *Attorney, Agent, or Firm* — Burr & Forman LLP; Lorne Forsythe

(57) ABSTRACT

A vehicle control system for reducing turn radius of a vehicle may include a controller and a torque control module operably coupled to the controller and to front wheels of a front axle of the vehicle and rear wheels of a rear axle of the vehicle. The controller may also be operably coupled to components and/or sensors of the vehicle to receive information including vehicle wheel speed and steering wheel angle. The torque control module may be operable, responsive to control by the controller, to apply a negative torque to an inside rear wheel during a turn and apply a positive torque to the front axle during the turn to compensate for the negative torque applied to the inside rear wheel to reduce the turn radius based on the steering wheel angle and the vehicle speed.

16 Claims, 6 Drawing Sheets

(51) Int. Cl.
  *B60L 7/10* (2006.01)
  *B60W 10/08* (2006.01)
  *B60W 10/18* (2012.01)
  *B62D 6/00* (2006.01)
  *B62D 7/15* (2006.01)

(52) U.S. Cl.
  CPC ..... *B60W 2520/12* (2013.01); *B60W 2520/26* (2013.01); *B60W 2520/28* (2013.01); *B60W 2540/10* (2013.01); *B60W 2540/12* (2013.01); *B60W 2552/40* (2020.02); *B60W 2710/083* (2013.01); *B60W 2710/18* (2013.01); *B60W 2720/406* (2013.01)

(56) References Cited

U.S. PATENT DOCUMENTS

| | | | | |
|---|---|---|---|---|
| 2017/0233957 | A1* | 8/2017 | Eul | B60K 23/0808 |
| | | | | 404/84.05 |
| 2020/0148255 | A1* | 5/2020 | Korsch | B62D 11/08 |
| 2021/0031785 | A1* | 2/2021 | Oh | B60W 50/10 |
| 2021/0197820 | A1* | 7/2021 | Keller | B62D 15/00 |
| 2021/0252976 | A1* | 8/2021 | Nahrwold | B60L 7/10 |
| 2021/0253162 | A1* | 8/2021 | Thompson | B60T 8/246 |
| 2022/0118979 | A1* | 4/2022 | Pursifull | B60G 3/00 |

\* cited by examiner

SYSTEM AND METHOD FOR VEHICLE TURNING RADIUS REDUCTION

TECHNICAL FIELD

Example embodiments generally relate to vehicle control technology and, more particularly, relate to a system and method for providing a reduced vehicle turning radius.

BACKGROUND

Vehicles with a relatively long wheelbase, such as trucks, often also have large turning radiuses. This can make such vehicles difficult to park or maneuver in relatively tight spaces. Such vehicles may also struggle to complete a U-turn in certain situations. Larger front wheel drive vehicles may also face similar issues.

Accordingly, it may be desirable to define a strategy for providing turning radius reduction that can be implemented to provide a more satisfying user experience for drivers of these and other vehicles.

BRIEF SUMMARY OF SOME EXAMPLES

In accordance with an example embodiment, a vehicle control system for a vehicle may be provided. The system may include a controller and a torque control module operably coupled to the controller and to front wheels of a front axle of the vehicle and rear wheels of a rear axle of the vehicle. The controller may also be operably coupled to components and/or sensors of the vehicle to receive information including vehicle wheel speed and steering wheel angle. The torque control module may be operable, responsive to control by the controller, to apply a negative torque to an inside rear wheel during a turn and apply a positive torque to the front axle during the turn to compensate for the negative torque applied to the inside rear wheel to reduce the turn radius based on the steering wheel angle and the vehicle speed.

In another example embodiment, a method of providing automated application of turn radius reduction in a driver assist mode is provided. The method may include receiving a mode selection selecting a turning radius reduction mode, receiving steering wheel angle and vehicle speed information to determine if turn radius reduction criteria are met during a turn, in response to the turn radius reduction criteria being met, applying a negative torque to an inside rear wheel, and applying a positive torque to front wheels of the vehicle to compensate for the negative torque applied to the inside rear wheel.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
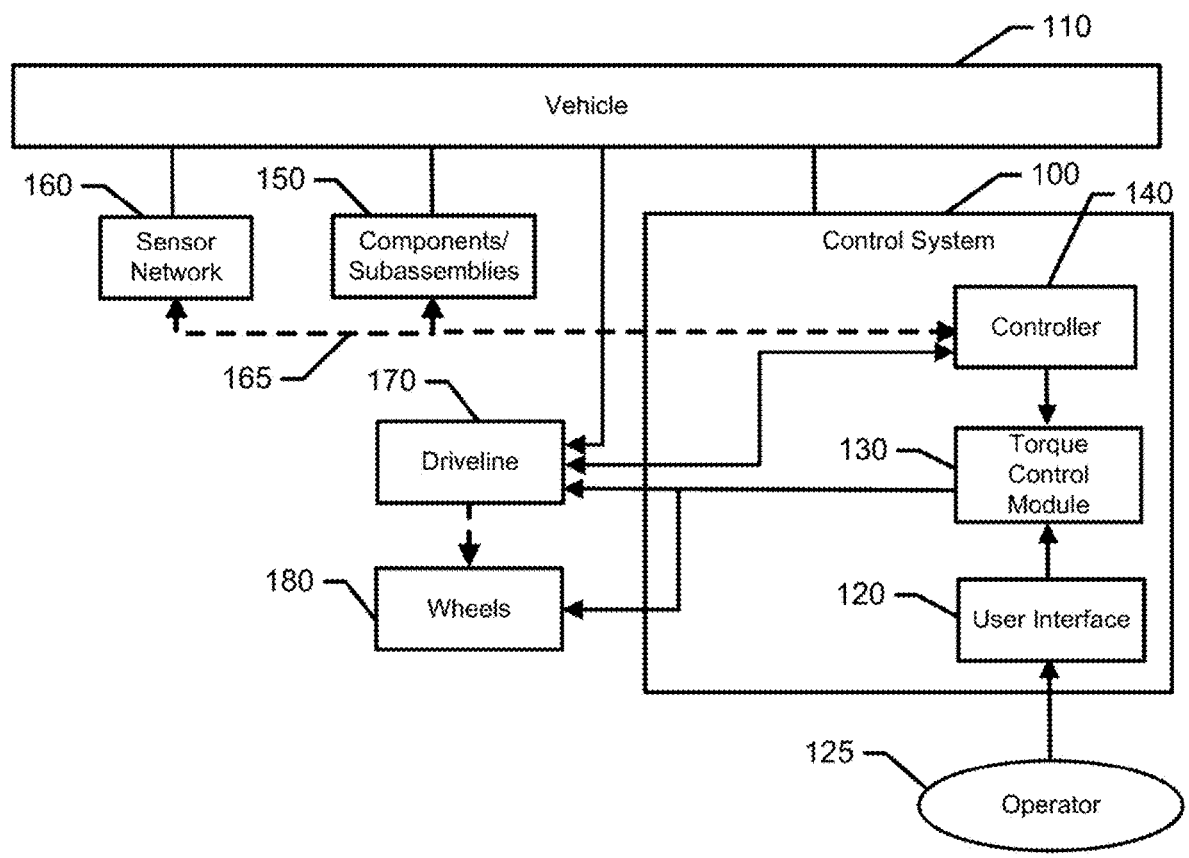
FIG. 1 illustrates a block diagram of a vehicle control system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, it may be desirable to define strategies that enable turning radius reduction for large vehicles. That said, strategies that may work in a large vehicle context may also work for other vehicles. Thus, example embodiments are not strictly limited to application in large vehicles.

It may be possible to use brake torque to assist in turning radius reduction via what is often referred to as brake-steer, or brake-assisted turning. However, it may be desirable to provide a system capable of improving the performance of brake-steer or brake-assisted turning. Example embodiments may provide such improvement by enabling strategic control of both positive and negative torque applied to the wheels of front and rear axles during a turn. By applying a negative torque to the rear inside wheel during a turn, and applying positive torque to the front wheels to pull the vehicle through the turn, not only can the vehicle turning radius be reduced, but the user experience during the application of the turning radius reduction may also be improved. In this regard, the positive torque may offset the negative torque so that no overall reduction in torque, speed or handling is noticed. In effect, a feed forward value of positive torque may be applied to front wheels to compensate for the negative torque that is applied to the inside rear wheel during a turn. Example embodiments may provide strategic control of the application of torque (both positive and negative) to improve turning radius reduction in terms both of the quantitative changes to the turning radius itself, and also the qualitative changes that are associated with the experience of employing the strategy.

Some example embodiments may therefore provide a system that is not only capable of providing reductions in vehicle turning radius, but is further capable of doing so in an automatic fashion that seamless for the driver. In this regard, for example, when enabled by the driver, a controller of the system of example embodiments may be configured to automatically apply negative torque to a rear inside wheel during a tight turn, and apply positive torque to front wheels. The application of such balanced torque may, in some cases, be determined based on or otherwise incorporate or consider wheel slip, which is a measure of the difference in speed between certain wheels. For example, wheel slip may be determined for the rear inside wheel, and may be controlled during application of the turning radius reduction strategy.

FIG. 1 illustrates a block diagram of a control system 100 of an example embodiment. The components of the control system 100 may be incorporated into a vehicle 110 (e.g., via being operably coupled to a chassis of the vehicle 110, various components of the vehicle 110 and/or electronic control systems of the vehicle 110). Of note, although the components of FIG. 1 may be operably coupled to the vehicle 110, it should be appreciated that such connection may be either direct or indirect. Moreover, some of the components of the control system 100 may be connected to the vehicle 110 via intermediate connections to other components either of the chassis or of other electronic and/or mechanical systems or components.

The control system 100 may have a normal mode of operation that includes an input device in the form of control pedals and the steering wheel (or hand wheel). The pedals may include a brake pedal and an accelerator pedal pivotally mounted to the floor of the vehicle 110, and operable by an operator 125. The brake pedal may generally be used to provide inputs for control of braking torque, and the accelerator pedal may be used to provide inputs for control of propulsive torque. However, the normal mode of operation may not be desirable for all cases. Moreover, selectable other modes of operation, including one or more off-road driver assistance modes, parking modes, turn assist modes, etc., may also exist. Accordingly, the control system 100 of some example embodiments may further include a user interface 120. The operator 125 may operate the user interface 120, which may include or define a mode selector to shift out of the normal mode of operation and into any of the other modes of operation. In one example embodiment, the other modes of operation that can be selected by the operator 125 via the user interface 120 may include a turn assist mode, in which turn radius reduction may be initiated as described in greater detail below.

Of note, although the term turn assist mode will generally be referred to herein as being the mode in which example embodiments are performed, the name of the mode in which example embodiments may be applied is not important, and certainly not limiting. As noted above, other terms like brake-steering mode, parking mode, or any other mode in which the functionality described herein is applied, are also possible.

The control system 100 of example embodiments may also include the torque control module 130, which may be part of or otherwise operably coupled to a controller 140. The torque control module 130 may be configured to determine positive torque (e.g., propulsive torque) and/or negative torque (e.g., brake torque, regenerative torque, etc.) to be applied to the wheels, individually, in pairs or collectively (e.g., depending on driveline state and/or vehicle type) as described herein based on inputs from any or all of the controller 140, the user interface 120 or other components of the vehicle 110. In some cases, the controller 140 may be part of an electronic control system of the vehicle 110 that is configured to perform other tasks related or not related to propulsive and braking control or performance management. However, the controller 140 could be a dedicated or stand-alone controller in some cases.

In an example embodiment, the controller 140 may receive information that is used to determine vehicle status from various components or subassemblies 150 of the vehicle 100. Additionally or alternatively, various sensors that may be operably coupled to the components or subassemblies 150 may be included, and may provide input to the controller 140 that is used in determining vehicle status. Such sensors may be part of a sensor network 160 and sensors of the sensor network 160 may be operably coupled to the controller 140 (and/or the components or subassemblies 150) via a vehicle communication bus (e.g., a controller area network (CAN) bus) 165.

The components or subassemblies 150 may include, for example, the steering wheel of the vehicle, a brake assembly, a propulsion system and/or a wheel assembly of the vehicle 110. The brake assembly may be configured to provide braking inputs to braking components of the vehicle 110 (e.g., friction brakes and electrical methods of braking such as regenerative braking) based on a braking torque determined by the controller 140 and/or torque control module 130. In some cases, the brake assembly may include an electric brake boost (EBB) system, which uses electric brake boosters to sense driver input and reduce the amount of pedal pressure needed for braking. The propulsion system may include a gas engine, electric motor, or any other suitable propulsion device.

The controller 140 and/or torque control module 130 may be configured to determine positive and negative torque inputs for provision to components of a driveline 170 (e.g., driveshaft, differential(s), axle shaft(s), etc.) and wheels 180 of the vehicle 110. Thus, for example, the torque control module 130 may determine positive torque inputs for provision to the propulsion system to apply propulsive torque to the wheels 180 of the wheel assembly of the vehicle 110 via the driveline 170, and determine negative torque inputs for provision to the wheels 180 in the form of braking torque, regenerative torque, or the like. Moreover, one or more corresponding sensors of the sensor network 160 that may be operably coupled to the brake assembly and/or the wheel assembly may provide information relating to brake torque, brake torque rate, vehicle velocity, vehicle acceleration, individual wheel speeds, front/rear wheel speeds, vehicle pitch, etc. Other examples of the components or subassemblies 150 and/or corresponding sensors of the sensor network 160 may provide information relating to yaw, lateral G force, steering wheel angle, throttle position, selector button positions associated with chassis and/or vehicle control selections, etc.

Accordingly, for example, the controller 140 may be able to receive numerous different parameters, indications and other information that may be related to or indicative of different situations or conditions associated with vehicle status. The controller 140 may also receive information indicative of the intent of the operator 125 (e.g., based on mode selection, steering wheel angle, speed, etc.) relative to control of various aspects of operation of the vehicle 110 and then be configured to use the information received in association with the execution of one or more control algorithms that may be used to provide instructions to the torque control module 130 in order to control application of positive and negative torque to the wheels of the wheel assembly of the vehicle 110.

In an example embodiment, the operator 125 may use the user interface 120 to select the turn assist mode. The user interface 120 may be embodied by an interactive display in the vehicle 110, and may therefore be a soft switch provided on the display. However, in other examples, the user interface 120 may include a hard switch, a button, key, or other selectable operator located in the cockpit of the vehicle 110. Selection of the turn assist mode may correspondingly activate the torque control module 130 to provide the automated turning control described herein based on information provided by the components or subassemblies 150 and/or corresponding sensors of the sensor network 160. More specifically, selection of the turn assist mode may enable control of turning capabilities based on vehicle speed, steering wheel position, and a control of negative torque to an inner rear wheel, while providing a feed forward offsetting positive torque to the front wheels. Operation of the torque control module 130 will be described in greater detail below in reference to FIG. 2.

As noted above, when the torque control module 130 is active, and automated turning controls have been activated, outputs of the torque control module 130 may be provided to components of the driveline 170 of the vehicle 110. The controller 140 may therefore receive information to enable the controller 140 to determine a state of the driveline 170 of the vehicle 110, or the specific driveline characteristics for the type of vehicle involved may be programmed into the algorithms that are executable by the controller 140. The driveline 170 may include front and rear axles and various drive components for the front and rear axles and/or the components that provide coupling therebetween. Thus, for example, the driveline 170 may include a differential (e.g., a front differential for a front wheel drive vehicle) and gears and/or clutch components that operably couple the front and rear axles (and/or their driving components). In some examples, such as when the vehicle 110 is a battery electric vehicle (BEV), the driveline 170 may include individual electric motors for either each axle or even each wheel.

Figure 2:
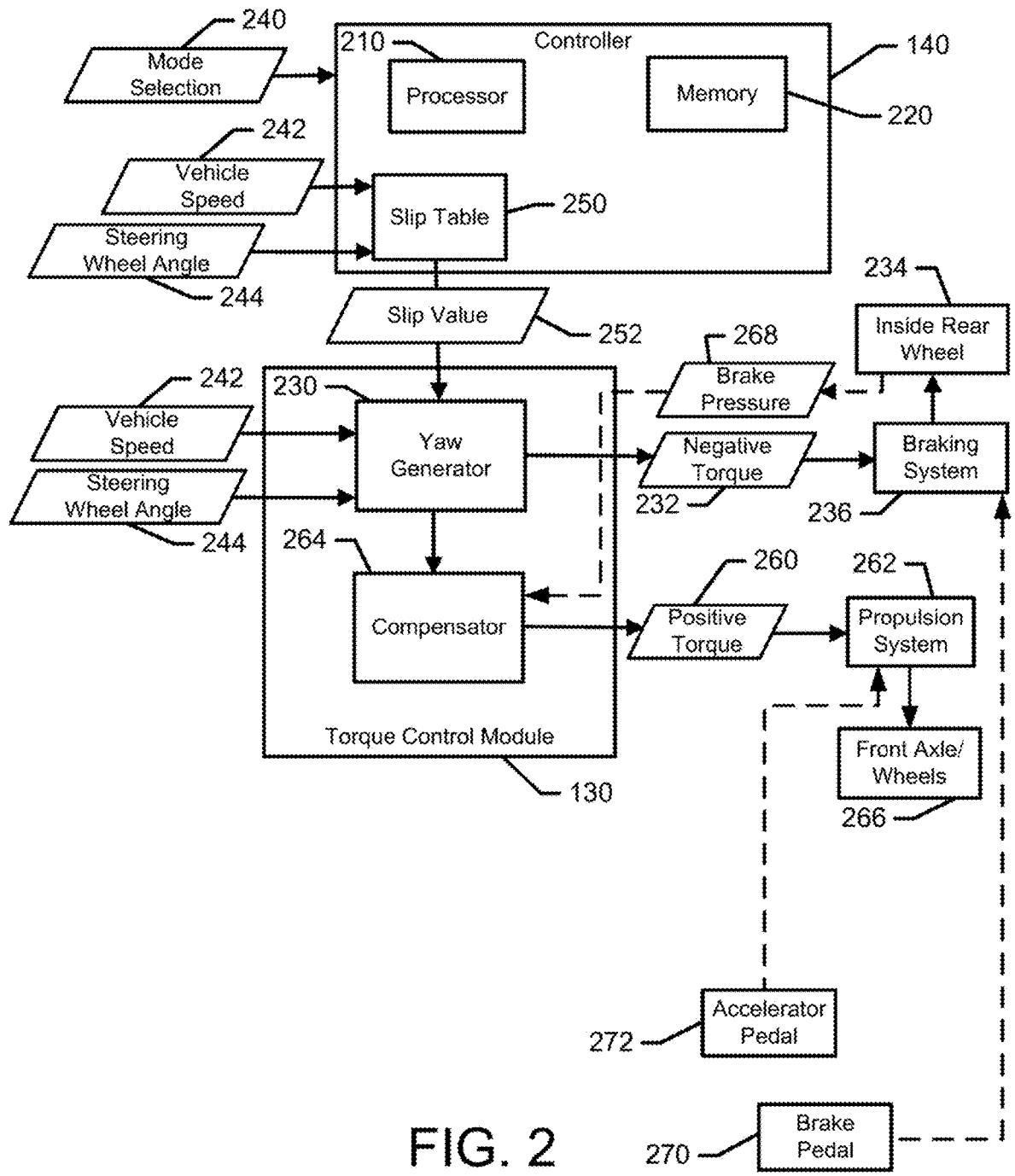
FIG. 2 illustrates a block diagram of some components of the vehicle control system of FIG. 1 in accordance with an example embodiment.

Referring now to FIG. 2, operation of the controller 140 and the torque control module 130 will be described in greater detail. FIG. 2 illustrates a block diagram of various components of the control system 100 in greater detail. In this regard, for example, FIG. 2 illustrates example interactions between the controller 140 and the torque control module 130 relative to information received thereby (e.g., from the sensor network 160, from various ones of the components/subassemblies 150, and/or from the user interface 120). Processing circuitry (e.g., a processor 210 and memory 220) at the controller 140 may process the information received by running one or more control algorithms. The control algorithms may include instructions that can be stored by the memory 220 for retrieval and execution by the processor 210. In some cases, the memory 220 may further store one or more tables (e.g., look up tables) and various calculations and/or applications may be executed using information in the tables and/or the information as described herein.

The processor 210 may be configured to execute the control algorithms in series or in parallel. However, in an example embodiment, the processor 210 may be configured to execute multiple control algorithms in parallel (e.g., simultaneously) and substantially in real time. The control algorithms may be configured to perform various calculations based on the information received/generated regarding specific conditions of vehicle components. The control algorithms may therefore execute various functions based on the information received, and generate outputs to drive the control of torque applied at the wheels of the vehicle 110 (e.g., individually or in pairs). The torque control module 130 may itself be a control algorithm, or may include control algorithms in the form of functional modules (or submodules) configured to perform specific functions for which they are configured relating to control of the vehicle 110 in the manner described herein. Thus, for example, the controller 140 may actually function as the torque control module 130 responsive to executing the control algorithms. However, in other cases, the torque control module 130 may be a component or module of the controller 140, or an entirely separate component (e.g., including its own corresponding processing circuitry).

In an example embodiment, the torque control module 240 may include a turn enhancer or yaw generator 230 that defines a negative torque value 232 for application to an inside rear wheel 234 (e.g., via a braking system 236 of the vehicle 110) to generate increased yaw for the vehicle 110 during a turn. The yaw generator 230 may be configured to generate the negative torque value 232 only when a mode selection 240 has been made to place the vehicle 110 (e.g., via its controller 140) in the turn assist mode (or other similar mode), and when certain other qualifying conditions have been met (e.g., a trigger event or trigger condition). For example, the yaw generator 230 may further receive inputs including vehicle speed 242 and steering wheel angle 244. The turn assist mode may, for example, only be operable below a certain or threshold speed (e.g., below 12 miles per hour (mph), or another suitable speed value). Moreover, in some cases, the turn assist mode may only be operable (and therefore the yaw generator 230 only active), when a turn of sufficient magnitude (at the low speed defined by the threshold value for vehicle speed 242). For example, the yaw generator 230 may only operate when the steering wheel has been turned to a maximum extent (or to a predetermined angle proximate to the maximum angle) in one direction or the other. Thus, the steering wheel angle 244 and the vehicle speed 242 may only be enabling factors or trigger criteria in some cases for operation of the yaw generator 230. However, in other cases, the yaw generator 230 may generate the negative torque value 232 based on one or both of the vehicle speed 242 and the steering wheel angle 244. Thus, for example, a table of torque values may be indexed to corresponding vehicle speed 242 and/or steering wheel angle 244 values to determine the amount of the negative torque value 232.

In some embodiments, alternatively or additionally, the negative torque value 232 may be generated may be generated based on additional or other criteria. For example, a slip table 250 may be provided in some cases in order to generate a slip value 252. The slip table 250 may include a series of output values that are determined based on respective input values. Based on the respective input values, the slip table 250 may be referenced in order to determine the slip value 230. As shown in FIG. 2, the slip table 250 may consider the vehicle speed 242 and/or the steering wheel angle 244 in order to determine the slip value 252. The slip value 252 itself may be defined at a value that is just below a peak tire coefficient of friction (which may be referred to as tire Mu). In such examples, if the turn assist mode is selected, if the vehicle speed 242 is below the threshold speed (e.g., 12 mph) and the steering wheel is turned to maximum angle for a given period of time (e.g., held at lock, thereby indicating that the driver is providing steering torque to hold the wheel against the end stop for at least the given period of time), then the slip value 252 may be used by the yaw generator 230 to define the negative torque value 232 to be applied to the inside rear wheel 234.

Since the application of the negative torque value 232 to the inside rear wheel 234 will increase the yaw rate of the vehicle 110 during the turn in progress, the turn radius of the vehicle 110 may be decreased, as desired. However, the provision of the negative torque value 232 (e.g., via regenerative braking or applying friction braking to the inside rear wheel 234 only), will tend to slow the vehicle 110 during the resulting turn, the slowing sensation is felt by the driver, and therefore makes the feeling of the turn less seamless. To generate a more seamless turn, example embodiments may provide a positive torque value 260 to a propulsion system 262 of the vehicle 110 via a compensator 264. The compensator 264 may be configured to generate a feed forward torque value to offset the negative torque value 232 to thereby make the turn more seamless. The positive torque value 260 may be provided to the propulsion system 262 to apply power, for example, to the front axle or front wheels 266 of the vehicle 110. Thus, for example, the front wheels 266 of the vehicle 110 may pull the vehicle 110 through the turn while the inside rear wheel 234 has a negative torque applied thereto to increase the yaw rate that can be generated, and thereby also increase the turn rate while avoiding any noticeable change in speed during the turn.

In an example embodiment, the compensator 264 may receive an input value indicative of an amount of negative torque actually applied at the inside rear wheel 234. For example, the compensator 264 may receive an indication of brake pressure 268 being applied at the inside rear wheel 234. The positive torque value 260 generated by the compensator 264 may therefore be proportional to the brake pressure 268 being exerted at the inside rear wheel 234. Thus, the positive torque value 260 and the negative torque value 232 may not be set to be equal values, but instead, the positive torque value 260 may be set for a given situation as a value that tends to make the slow down generated by the negative torque value 232 less noticeable while still increasing the rate of the turn (e.g., via increasing the yaw rate of the vehicle 110). However, in examples in which each of the front wheels 266 has an individual electric motor (e.g., in the case of some BEVs), the ratio could be set at a one to one ratio. Otherwise, for example, if the brake pressure is 1000 Nm, the amount of the positive torque value 260 may be lower than 1000 Nm.

As shown in FIG. 2, a brake pedal 270 of the vehicle 110 may be used to provide braking inputs to the braking system 236 (but to both wheels), and an accelerator pedal 272 may be used to provide propulsive inputs to the propulsion system 262 of the vehicle 110. These inputs may exist in addition to the inputs that are automatically provided by the torque control module 130 described herein. Thus, to the extent the driver operates either or both of the brake pedal 270 and the accelerator pedal 272, the torque control module 130 may provide its automatic modifications with positive and negative torque in an additive manner with manual inputs, while also being responsive to the changes made via manual inputs by the driver.

Figure 3:
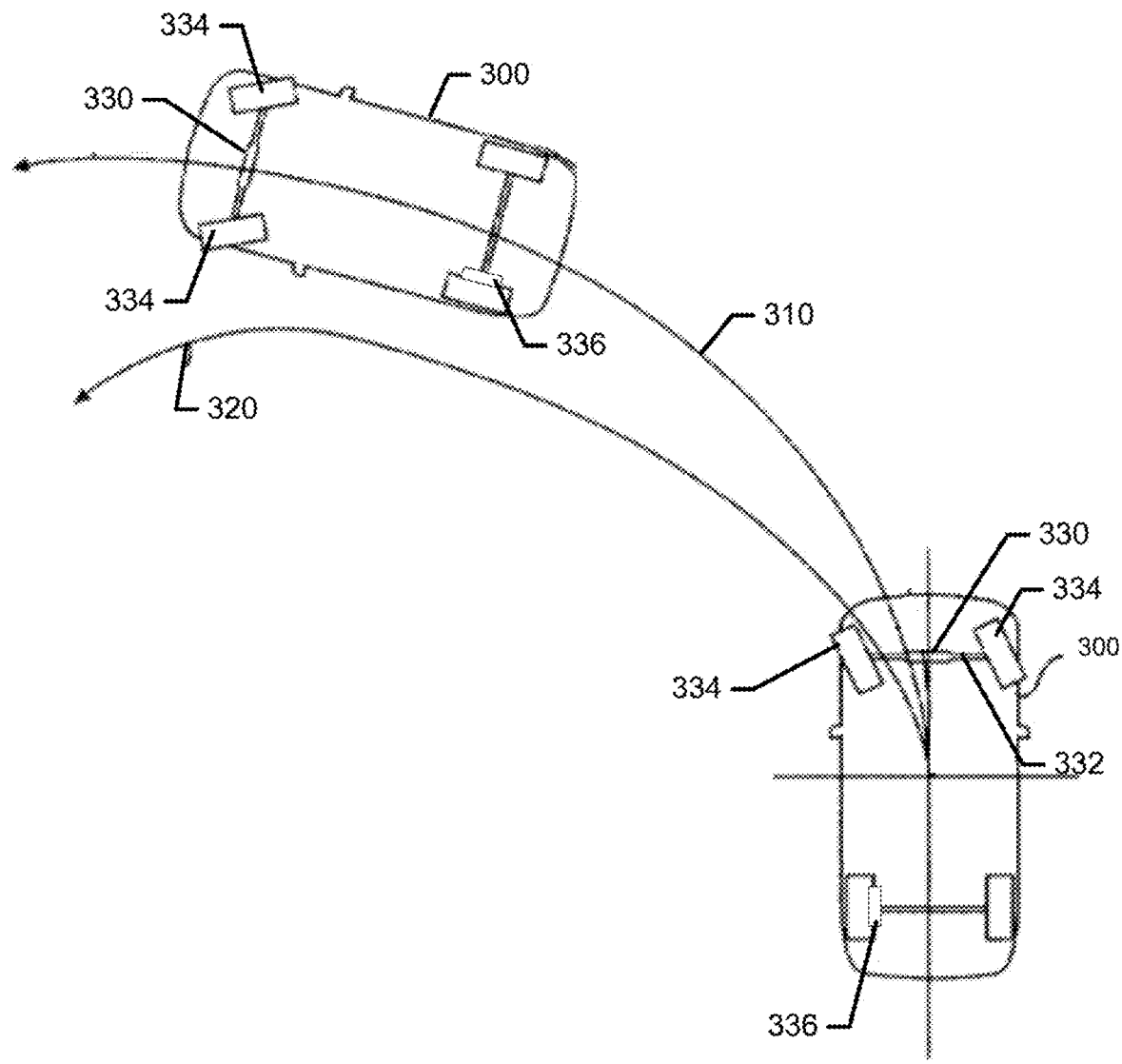
FIG. 3 illustrates a front wheel drive vehicle performing a reduced radius turn in accordance with an example embodiment.
Figure 4:
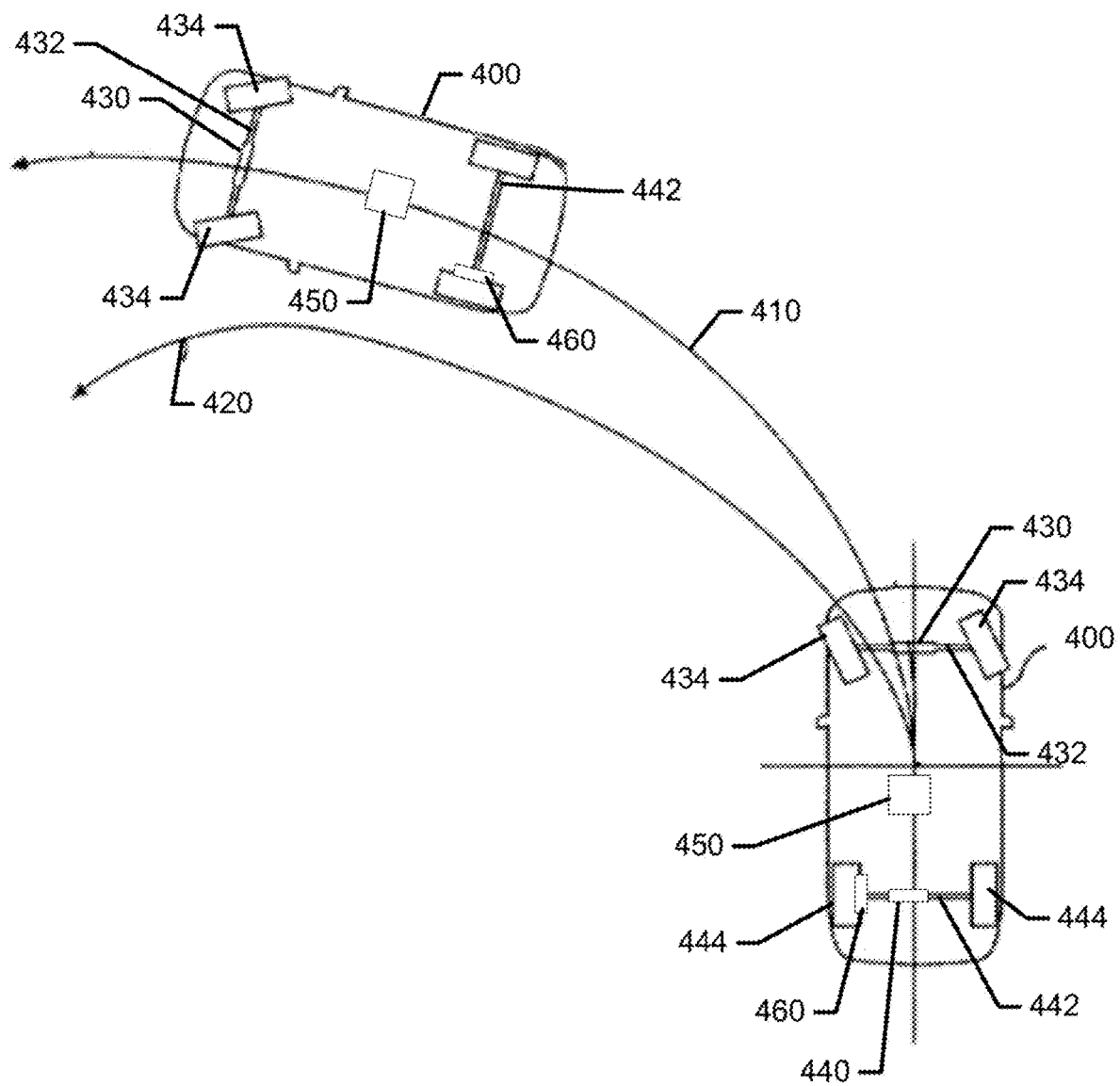
FIG. 4 illustrates a plot of battery electric vehicle tracks during a normal turn and during a turn employing brake-steering of an example embodiment.
Figure 5:
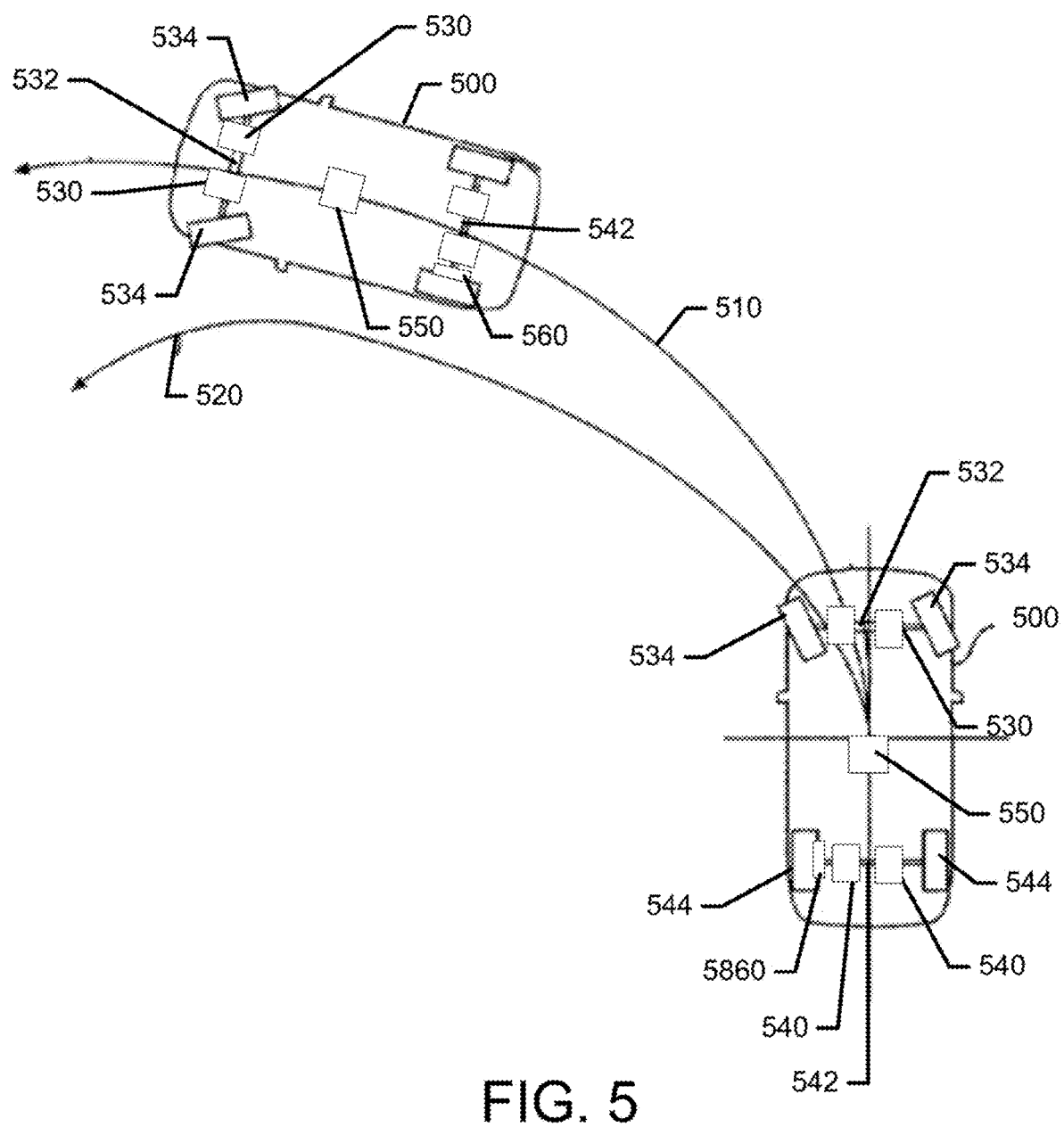
FIG. 5 illustrates a different battery electric vehicle than that of FIG. 4 conducting the normal turn and reduced radius turn in accordance with an example embodiment.

Of note, the propulsion system 262 of the vehicle could take numerous different forms. FIGS. 3-5 each illustrate a corresponding different example of the forms that could be taken in some example embodiments. Referring first to FIG. 3, a front wheel drive vehicle 300 (as one example of vehicle 110) is shown while conducting a turn. A normal (unmodified) turn radius 310 is shown for comparison to a modified turn radius 320.

The front wheel drive vehicle 300 has a front differential 330 and front axle 332 to which front wheels 334 are attached. Power from a drive shaft of the front wheel drive vehicle 300 is provided to the front wheels 334 responsive to the positive torque value 260 discussed above, while the negative torque value 232 is provided in inside rear brake 336.

The modified turn radius 320 illustrates the expected decrease in turn radius that can be expected by applying the negative torque value 232 to the inside rear wheel 340 during the turn. Of note, slip in this example is determined by comparing the speed of the inside rear wheel 340 to a speed of the outside rear wheel 342. But other ways of determining slip could be used in other examples. As shown in FIG. 3, the positive torque value 260 applied to the front wheels 334 pulls the vehicle 300 through the turn while the negative torque value 232 applied to the inside rear wheel 340 increases the yaw rate to cause turning at the modified turn radius 320, which is smaller than the normal turn radius 310.

Referring now to FIG. 4, a BEV 400 (as another example of vehicle 110) is shown while conducting a turn. A normal (unmodified) turn radius 410 is shown for comparison to a modified turn radius 420. The BEV 400 has a front electric motor 430 that drives a front axle 432 (and the front wheels 434 attached thereto) and a rear electric motor 440 that drives a rear axle 442 (and rear wheels 444 attached thereto). The BEV 400 also has a controller 450 (e.g., an example of controller 140) that controls the application of power to the front and rear axles 432 and 442. In an example embodiment, the controller 450 may execute control (e.g., via execution of management software applications) over balancing the application of power to the front electric motor 430 and the rear electric motor 440. In other words, the controller 450 may provide for a connection (at least from a control perspective) between the front axle 432 and rear axle 442.

Each of the front wheels 434 and rear wheels 444 may also have a corresponding friction brake and/or regenerative brake assembly associated therewith. The inside rear wheel for the turn demonstrated includes a brake assembly 460 that can be individually operated to provide the negative torque value 232 discussed above. When a reduced turning radius is desired, and conditions described above in reference to FIG. 2 are met, the torque control module 130 described above may operate in similar fashion to the description above. However, since the front and rear axles 432 and 442 are connected (e.g., via software control provided by the controller 450), the front and rear axles 432 and 442 may initially be disconnected (e.g., by the controller 450) prior to initiating (or during execution of) the reduced turning radius turn. Accordingly, the controller 450 disconnects the front and rear axles 432 and 442 prior to application of the negative torque value 232 to the brake assembly 460 at the inside one of the rear wheels 444. The controller 450 also manages the application of positive torque value 260 to the front wheels 434 via the front electric motor 430 to compensate for the negative torque value 232.

The modified turn radius 420 illustrates the expected decrease in turn radius that can be expected by applying the negative torque value 232 to the inside one of the rear wheels 444 via the brake assembly 460 during the turn. As shown in FIG. 4, the positive torque value 260 applied to the front wheels 434 pulls the vehicle 400 through the turn while the negative torque value 232 applied to the inside one of the rear wheels 444 via the brake assembly 460 increases the yaw rate to cause turning at the modified turn radius 420, which is smaller than the normal turn radius 410.

Referring now to FIG. 5, a BEV 500 (as another example of vehicle 110) is shown while conducting a turn. A normal (unmodified) turn radius 510 is shown for comparison to a modified turn radius 520. The BEV 500 has a separate instance of a front electric motor 530 on the front axle 532 for each respective one of the front wheels 534. The BEV 500 also has a separate instance of a rear electric motor 540 on the rear axle 542 for each respective one of the rear wheels 544. The BEV 400 also has a controller 550 (e.g., an example of controller 140) that controls the application of power to the front and rear axles 532 and 542. In an example embodiment, the controller 550 may execute control (e.g., via execution of management software applications) over balancing the application of power to the front electric motors 530 and the rear electric motors 540. In other words, the controller 550 may provide for a connection (at least from a control perspective) between the front axle 532 and rear axle 542.

Each of the front wheels 534 and rear wheels 544 may also have a corresponding friction brake and/or regenerative brake assembly associated therewith. The inside rear wheel for the turn demonstrated includes a brake assembly 560 that can be individually operated to provide the negative torque value 232 discussed above. When a reduced turning radius is desired, and conditions described above in reference to FIG. 2 are met, the torque control module 130 described above may operate in similar fashion to the description above. However, since the front and rear axles 532 and 542 are connected (e.g., via software control provided by the controller 550), the front and rear axles 532 and 542 may initially be disconnected (e.g., by the controller 550) prior to initiating (or during execution of) the reduced turning radius turn. Accordingly, the controller 550 disconnects the front and rear axles 532 and 542 prior to application of the negative torque value 232 to the brake assembly 560 at the inside one of the rear wheels 544. The controller 550 also manages the application of positive torque value 260 to the front wheels 534 via the front electric motor 530 to compensate for the negative torque value 232.

The modified turn radius 520 illustrates the expected decrease in turn radius that can be expected by applying the negative torque value 232 to the inside one of the rear wheels 544 via the brake assembly 560 during the turn. As shown in FIG. 4, the positive torque value 260 applied to the front wheels 534 pulls the BEV 500 through the turn while the negative torque value 232 applied to the inside one of the rear wheels 544 via the brake assembly 560 increases the yaw rate to cause turning at the modified turn radius 520, which is smaller than the normal turn radius 510.

Figure 6:
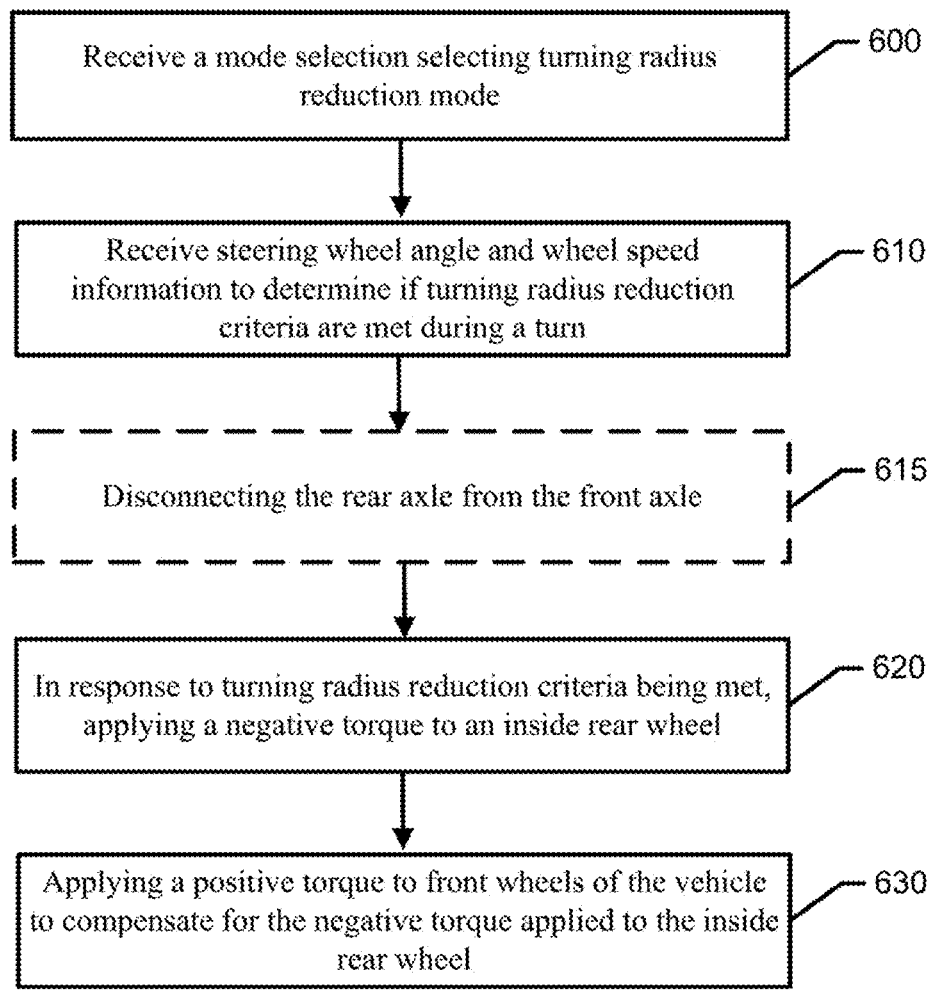
FIG. 6 illustrates a method of controlling a vehicle in accordance with an example embodiment.

FIG. 6 illustrates a block diagram of one example method of providing automated application of turn radius reduction in a driver assist mode. The method may include receiving a mode selection selecting a turning radius reduction mode at operation 600. The method may further include receiving steering wheel angle and vehicle speed information to determine if turn radius reduction criteria are met during a turn at operation 610. In response to the turn radius reduction criteria being met, the method may further include applying a negative torque to an inside rear wheel at operation 620, and applying a positive torque to front wheels of the vehicle to compensate for the negative torque applied to the inside rear wheel at operation 630. In some embodiments, (e.g., if the vehicle 110 is a BEV) the application of negative torque may not be accomplished until disconnection of the rear axle and the front axle at operation 615.

Example embodiments may therefore also include a vehicle control system for reducing turn radius of a vehicle, which may include a controller and a torque control module operably coupled to the controller and to front wheels of a front axle of the vehicle and rear wheels of a rear axle of the vehicle. The controller may also be operably coupled to components and/or sensors of the vehicle to receive information including vehicle wheel speed and steering wheel angle. The torque control module may be operable, responsive to control by the controller, to apply a negative torque to an inside rear wheel during a turn and apply a positive torque to the front axle during the turn to compensate for the negative torque applied to the inside rear wheel to reduce the turn radius based on the steering wheel angle and the vehicle speed. The steering wheel angle and vehicle speed may be merely enabling, or may dictate values of the compensation or individual torque values in various example embodiments. The compensation need not be provided at a 1:1 ratio, although it could be in some cases. In many cases, less positive torque may be applied than the amount of negative torque, but more positive torque is also possible.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the controller may be configured to control vehicle operation in any of a plurality of operator selectable modes of operation, and the torque control module may be configured to apply the braking torque during the turn responsive to operator selection of a corresponding one of the modes of operation and detection of a trigger event. In an example embodiment, the trigger event may include detecting the steering wheel angle being at a maximum angle that corresponds to a limit of rotation of the steering wheel, and detecting vehicle speed below a threshold speed (e.g., 12 mph). In some cases, the negative torque may be a brake torque applied by a brake assembly that includes a friction brake applied only to the inside rear wheel, while the vehicle is a front wheel drive, gas powered vehicle. In an example embodiment, the vehicle may be a battery electric vehicle, and the controller may disconnect the front axle from the rear axle prior to applying the negative torque to the inside rear wheel. In some cases, the negative torque may be a brake torque applied by a brake assembly including a friction brake applied only to the inside rear wheel. In an example embodiment, the negative torque may be a regenerative torque applied by a brake assembly comprising regenerative brakes. In some cases, the positive torque may be applied to a front electric motor that provides power to both of the front wheels. In an example embodiment, the positive torque may be applied to a first front electric motor that provides power to one of the front wheels and a second front electric motor that provides power to the other of the front wheels. In some cases, the controller may apply the negative torque based on a slip value determined for the inside rear wheel. In an example embodiment, the slip value may be a peak coefficient of friction for the inside rear wheel based on the vehicle speed. In some cases, a value of the positive torque may be determined based on a brake pressure applied to the inside rear wheel. In an example embodiment, the positive torque and the negative torque may be automatically applied additively with other torque applications initiated by the driver via a brake pedal or accelerator pedal of the vehicle.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated That which is claimed:

1. A vehicle control system for reducing turn radius of a vehicle, the system comprising:
 a controller operably coupled to components and/or sensors of the vehicle to receive information including vehicle wheel speed and steering wheel angle; and
 a torque control module operably coupled to the controller and to front wheels of a front axle of the vehicle and rear wheels of a rear axle of the vehicle, the torque control module being operable, responsive to control by the controller, to apply a negative torque to an inside rear wheel during a turn and apply a positive torque to the front axle during the turn to compensate for the negative torque applied to the inside rear wheel to reduce the turn radius based on the steering wheel angle and the vehicle wheel speed,
 wherein the negative torque is defined by a slip value for the inside rear wheel that is based on the vehicle wheel speed and the steering wheel angle,
 wherein the slip value for the inside rear wheel is a peak coefficient of friction for the inside rear wheel,
 wherein the torque control module detects a trigger event and immediately thereafter determines the slip value for the inside rear wheel prior to applying the negative torque to the inside rear wheel and applying the positive torque to the front axle, and
 wherein the controller disconnects the front axle from the rear axle prior to applying the negative torque to the inside rear wheel.

2. The system of claim 1, wherein the controller is configured to control vehicle operation in any of a plurality of operator selectable modes of operation, and
 wherein the torque control module is configured to apply the negative torque during the turn responsive to operator selection of a corresponding one of the modes of operation.

3. The system of claim 1, wherein the trigger event comprises detecting the steering wheel angle being at a maximum angle that corresponds to a limit of rotation of the steering wheel, and detecting vehicle speed below a threshold speed.

4. The system of claim 2, wherein the negative torque is a brake torque applied by a brake assembly comprising a friction brake applied only to the inside rear wheel.

5. The system of claim 1, wherein a value of the positive torque is determined based on a brake pressure applied to the inside rear wheel.

6. The system of claim 1, wherein the positive torque and the negative torque are automatically applied additively with other torque applications initiated by the driver via a brake pedal or accelerator pedal of the vehicle.

7. A vehicle control system for reducing turn radius of a vehicle, the system comprising:
 a controller operably coupled to components and sensors of the vehicle to receive information including vehicle wheel speed and steering wheel angle; and
 a torque control module operably coupled to the controller and to front wheels of a front axle of the vehicle and rear wheels of a rear axle of the vehicle, the torque control module being operable, responsive to control by the controller, to apply a negative torque to an inside rear wheel during a turn and apply a positive torque to the front axle during the turn to compensate for the negative torque applied to the inside rear wheel to reduce the turn radius based on the steering wheel angle and the vehicle wheel speed,
 wherein the torque control module detects a trigger event and immediately thereafter determines a slip value for the inside rear wheel prior to applying the negative torque to the inside rear wheel and applying the positive torque to the front axle,
 wherein the controller disconnects the front axle from the rear axle prior to applying the negative torque to the inside rear wheel, and
 wherein the vehicle is a battery electric vehicle.

8. The system of claim 7, wherein the negative torque is a brake torque applied by a brake assembly comprising a friction brake applied only to the inside rear wheel.

9. The system of claim 7, wherein the negative torque is a regenerative torque applied by a brake assembly comprising regenerative brakes.

10. The system of claim 7, wherein the positive torque is applied to a front electric motor that provides power to both of the front wheels.

11. The system of claim 7, wherein the positive torque is applied to a first front electric motor that provides power to one of the front wheels and a second front electric motor that provides power to the other of the front wheels.

12. A method of providing automated application of turn radius reduction in a driver assist mode, the method comprising:
 receiving a mode selection selecting a turning radius reduction mode;
 receiving steering wheel angle and vehicle speed information to determine if turn radius reduction criteria are met during a turn;
 in response to the turn radius reduction criteria being met, applying a negative torque to an inside rear wheel; and
 applying a positive torque to front wheels of the vehicle to compensate for the negative torque applied to the inside rear wheel,
 wherein the negative torque is defined by a slip value for the inside rear wheel that is based on a vehicle wheel speed and a steering wheel angle,
 wherein the slip value for the inside rear wheel is a peak coefficient of friction for the inside rear wheel,
 wherein immediately after the turn radius reduction criteria are met, the slip value for the inside rear wheel is determined prior to applying the negative torque to the inside rear wheel and applying the positive torque to the front wheels, and
 wherein the front wheels are disconnected from a rear axle prior to applying the negative torque to the inside rear wheel.

13. The method of claim 12, wherein the vehicle is a battery electric vehicle.

14. The method of claim 12, wherein applying the negative torque comprises applying a brake torque via a brake assembly comprising a friction brake applied only to the inside rear wheel.

15. The method of claim 12, wherein applying the negative torque comprises applying a regenerative torque only to the inside rear wheel.

16. The method of claim 12, wherein a value of the positive torque is determined based on a brake pressure applied to the inside rear wheel.

* * * * *